No. 710,081. Patented Sept. 30, 1902.
C. P. STEINMETZ & W. L. R. EMMET.
SYSTEM OF ELECTRICAL DISTRIBUTION.
(Application filed Dec. 21, 1899.)
(No Model.)
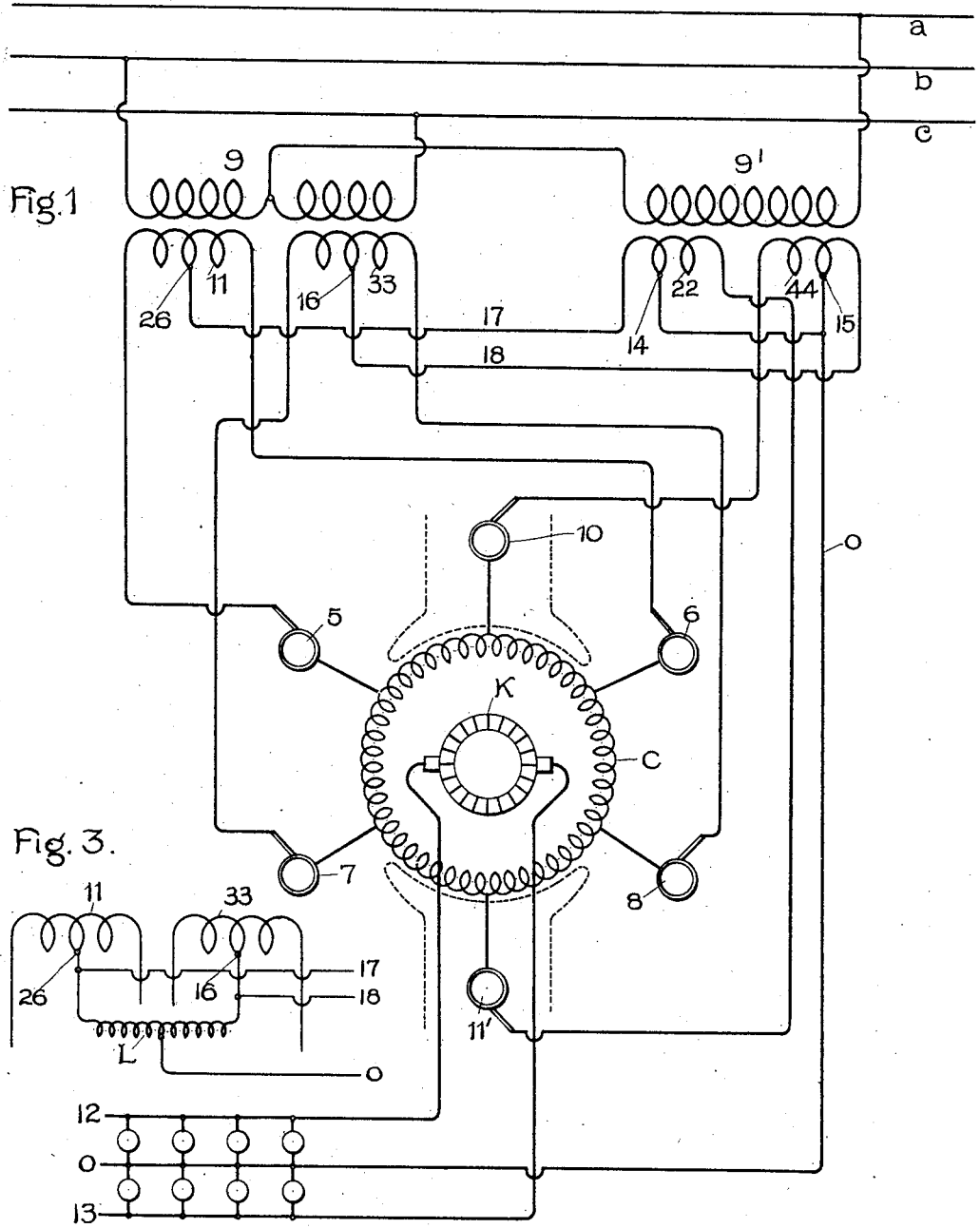
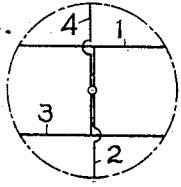
Witnesses.
Edward Williams, Jr.
Inventors
Charles P. Steinmetz,
William Le R. Emmet,
by Albert G. Davis Atty

United States Patent Office.

CHARLES P. STEINMETZ AND WILLIAM L. R. EMMET, OF SCHENECTADY, NEW YORK, ASSIGNORS TO THE GENERAL ELECTRIC COMPANY, A CORPORATION OF NEW YORK.

SYSTEM OF ELECTRICAL DISTRIBUTION.

SPECIFICATION forming part of Letters Patent No. 710,081, dated September 30, 1902.

Application filed December 21, 1899. Serial No. 741,101. (No model.)

*To all whom it may concern:*

Be it known that we, CHARLES P. STEINMETZ and WILLIAM LE R. EMMET, citizens of the United States, residing at Schenectady, county of Schenectady, State of New York, have invented certain new and useful Improvements in Systems of Electrical Distribution, (Case No. 1,208,) of which the following is a specification.

Our present invention relates to alternating-current systems of distribution and as to some of its features, more especially to that arrangement in which a neutral conductor is brought out from a point of neutral potential on an alternating-current supply system and is led forward and coöperates with direct-current mains of a converter to form a multiple-conductor direct-current system of distribution. Where a system of transformers is used for feeding the converter, the invention is particularly valuable, in that it permits a reduction in the number of transformers which has heretofore been found necessary for feeding a converter of any given number of phases.

In the embodiment which we have selected for the purpose of illustrating our invention the alternating current from the source is passed through a system of phase-changing transformers, the currents from the secondaries of which are suitably proportioned and passed to the armature of the converter, by which they are changed into direct current.

The scope of our invention will be better understood, both as to its broad features and in its more limited details, by reference to the claims appended hereto, while a better understanding of the same, both in its construction and mode of application, will be had by an examination of the following description, taken in connection with the accompanying drawings, in which—

Figure 1 represents one form of our invention in diagram; Fig. 2, an explanatory diagram, and Fig. 3 a modification.

One of the features of our invention consists in supplying a rotary converter having a number of phases represented by a multiple of three by currents which are the resultants of currents displaced from each other in phase by ninety degrees. In the instance shown a six-phase rotary converter is fed by means of two overlapping T-connected three-phase systems, the nature of which will be best understood by reference in detail to the drawings. Fig. 1 represents such a system, and Fig. 2 denotes the relation of electromotive forces operating therein.

Referring first to Fig. 2, the dotted circle represents the locus of the ends of vector electromotive forces combined to produce a six-phase system. The particular relation of electromotive forces chosen consists of two sets of quarter-phase electromotive forces, each set consisting of an electromotive force of given value operating in conjunction with another electromotive force having a ratio thereto of $\frac{\sqrt{3}}{2}$, the electromotive forces being so combined that the resultant electromotive forces represented by connecting the ends of the vectors will be equal. Thus the line 1 may represent one of these electromotive forces or vectors and the line 2 the other displaced from the first by ninety degrees and combined with the first electromotive force 1, so that the end of the vector 2 is connected to the middle point in the length of the vector 1. With the proportions indicated the resultant vector formed by connecting either end of the vector 1 with the free end of the vector 2 is equal to the vector 1. Such a system of electromotive forces is produced in practice by the use of two transformer or other windings carrying currents in quarter-phase relation to each other and connected so that the end of one winding joins the middle point in the other winding, the electromotive forces of the windings being suitably proportioned, as before referred to.

A second system of electromotive forces is indicated in Fig. 2 by the lines 3 4; but these electromotive forces operate in a reverse relation with respect to the first set, as will be seen. The inscribing circle is thus divided into six equal parts by means of the intersections of the lines 1 to 4, these intersections representing the points of connections of windings carrying electromotive forces related to each other and arranged in the proportions indicated. The physical embodiment of such a system is diagrammatically shown in Fig. 1, in which the winding 11 represents a winding generating an electromotive force corresponding to the line 1 of Fig. 2, while the winding 22, connected at one end to the middle of the winding 11, represents the line 2, similarly connected to line 1. In a similar manner the winding 33 corresponds to the line or electromotive force 3, (shown in Fig. 2,) while the winding 44 corresponds to the line 4, connected to the middle point of the line 3. It is to be noted that while the lower end of the line 4 is connected to the middle point of the line 3 the upper end of the line 2, on the contrary, is similarly connected to the middle point of the line 1. The connections of these lines being reversed, the connection of the winding 44 is accordingly reversely connected with the winding 33 in order to reproduce the arrangement of electromotive forces indicated in Fig. 2. This is shown in the drawings by connecting the left-hand end of the winding 22 to winding 11, while, on the contrary, the right-hand end of the winding 44 is connected to the winding 33. If the terminals of these windings be connected to equally-spaced points in a closed armature-winding, according to the scheme of connections represented in Fig. 2, then resultant six-phase currents will flow in said armature-winding. At C is indicated the armature-winding of a rotary converter, from which taps are brought out at six equally-spaced points and connected to suitable collector-rings. These rings are connected to the supply system in the following manner: The rings 5 6 lead to the terminals of the winding 11 and are connected to points in the armature displaced from each other by one-third of the polar pitch. In a similar manner the rings 7 8 receive current from the ends of the winding 33 and are connected across the same arc in the armature-winding as the rings 5 and 6, the connections being made in such a manner that the middle of the arc formed by the connection of the rings 7 and 8 is displaced one-half of the polar pitch from the middle point of the arc formed by the connection of the rings 5 and 6. Since the windings 11 and 33 are inductively related to the same primary exciting-winding 9, they give rise to electromotive forces in the same phase, and their sphere of action is represented in Fig. 2 by the lines of electromotive force 1 and 3.

The collector-ring 10 leads from a point in the armature-winding of the converter midway between the connection of the rings 5 and 6 and receives current from the free end of the winding 44, the other end of which is connected to the middle of the coil 33, as previously described. In a similar manner the ring 11' leads from a point in the armature-winding midway between the points of connection of the rings 7 and 8 and receives current from the free end of the winding 22, the opposite end of which is connected to the middle of the winding 11, as already mentioned. The arrangement shown corresponds to a bipolar field, so that if the field is multipolar the connections are to be made accordingly, as will readily be understood. With the system of connections thus described the quarter-phase electromotive forces circulating in the windings of the supply system are so combined when they reach the converter-armature as to produce therein six-phase currents, which latter are changed into direct current in the ordinary manner.

At K we have indicated the commutator of the converter, to which direct-current mains 12 and 13 are connected; but for convenience in illustration we have not shown any connection between the commutator and the armature-winding, although it is of course to be understood that any usual or suitable system of connections may be employed.

In cases where it is desired to operate translating devices on the three-wire system from the direct-current side of a rotary converter our system for supplying the converter is particularly desirable, since while permitting the use of a smaller number of transformers than has hitherto been found necessary it at the same time affords an easy means for obtaining a point of neutral potential, to which a neutral conductor from the three-wire system may be connected in a well-understood manner. Thus, as seen from Fig. 2, the center of the circle constituting the locus of the ends of lines representing electromotive forces lies within both of the lines 2 and 4, which actually are superposed on each other, but which for convenience of illustration are shown in the figure as parallel to each other and slightly separated. From the geometry of the figure it will be seen that this point lies two-thirds of the distance from the outer end of each of the lines 2 and 4. Since the windings 22 and 44 represent sources of electromotive force related in the same way as the lines 2 4, this point of neutral potential may be obtained by connecting together points in the said windings located two-thirds of the distance from the free ends of the respective coils. The point 14 is accordingly connected with the point 15, thus making the common connection a point of neutral potential with respect to the resultant electromotive forces existing at the collector-rings of the converter. The neutral conductor O leads from this common connection and coöperates with the direct-current mains 12 and 13 to form a three-wire distributing system.

In some cases there may be considerable practical difficulty in connecting intermediate points in the transformer-windings in order to secure a neutral, particularly so where the transformers are not specially constructed or their coils easily accessible. In such cases we make use of the following device:

The tapping-in points 16 and 26 of the T-connected windings are joined by means of a compensator, to the middle point in the length of which the neutral conductor is connected.

In Fig. 3 so much of the system in Fig. 1 is shown as is necessary to understand the connections of the compensator. Thus in Fig. 3 the coils 11 and 33 are the same as the coils 11 and 33 in Fig. 1, while the leads 17 and 18 are supposed to be connected to coöperating coils in exactly the same manner as the leads 17 and 18 in Fig. 1. The only difference is that the neutral conductor O (shown in Fig. 1) is in this case not connected to the points 14 and 15, but, on the contrary, to the middle point of the compensator L, (shown in Fig. 3,) the terminals of the compensator being connected, respectively, to the middle points of the windings 11 and 33.

Throughout the above description we have purposely refrained from stating in what manner the secondary windings of the alternating supply system were to receive current from the source of supply. It is to be understood, however, that this connection is to be made in such a manner as will cause quarter-phase electromotive forces to be set up in the windings in direct connection to the converter. For this purpose these windings may be supplied by means of quarter-phase primary windings, or if currents of this phase relation be not employed, then by other currents combined in such a manner as to produce resultant quarter-phase fluxes arranged to act upon said windings inductively or otherwise.

In Fig. 1 we have shown three-phase mains $a\ b\ c$ feeding the two primary windings 9 9'. These primary windings, however, are connected with the end of one to the middle point of the other and are so proportioned that the winding constituting the base is related to the other in the proportion of $2:\sqrt{3}$, whereby when three-phase currents are fed to the three free terminals of the windings as thus connected resulant quarter-phase currents are produced, which latter act to set up similarly-related electromotive forces in coils inductively related thereto. It will thus be seen that the primary 9' and its free end, in conjunction with the free ends of the primary 9, receiving current from three-phase mains, operates to set up quarter-phase electromotive forces in the secondary windings heretofore referred to.

Although for the purpose of making clear the nature of our invention we have described a particular and specific embodiment of the same, it is to be understood that we are not to be limited to the details of the invention thus described, but that, on the contrary, our claims are to be given a much broader scope. Thus, as a concrete example, the converter heretofore mentioned need not necessarily be supplied with current from transformers, but may instead receive current from suitable windings on dynamo-electric generators or the like.

We do not herein claim, broadly, the connection of windings across chords of an armature-winding, since the same is the invention of Charles P. Steinmetz, by whom application therefor is about to be made.

What we claim as new, and desire to secure by Letters Patent of the United States, is—

1. The combination of a rotary converter having an odd number of phases, and means for supplying said converter with current derived from quarter-phase electromotive forces.

2. The combination of a rotary converter having an odd number of phases, and means for supplying said converter with current derived from quarter-phase magnetomotive forces.

3. The combination of a converter having a number of phases equal in number to a multiple of three, and means for operating said converter with current derived from quarter-phase electromotive forces.

4. The combination of four transformer-windings, means for generating electromotive forces of the same phase in two of the windings, means for generating in the other windings electromotive forces bearing a quarter-phase relation to the electromotive forces in the first two windings, and a six-phase alternating-current dynamo-electric machine supplied with current from said windings.

5. The combination of a plurality of sources of resultant three-phase electromotive forces, each source consisting of two windings having the middle point of one connected to a terminal of the other, a dynamo-electric machine, and connections between each source and points in a winding on said machine.

6. The combination of a plurality of sources of resultant three-phase electromotive forces, each source consisting of two windings having the middle point of one connected to a terminal of the other, a dynamo-electric machine, and connections between each source and points in a winding on said machine displaced by one-third of the polar pitch.

7. The combination of a dynamo-electric machine having a number of phases represented by a multiple of three, and a plurality of sources of resultant three-phase electromotive forces, each of said sources consisting of two windings the terminal of one of which is connected into an intermediate point in the length of the other.

8. The combination of a rotary converter having a number of phases represented by a multiple of three, and a plurality of sources of resultant three-phase electromotive forces, each of said sources consisting of two windings the terminal of one of which is joined to the middle point of the other.

9. The combination of a rotary converter having a number of phases represented by a multiple of three, a plurality of sources of resultant three-phase electromotive forces, each of said sources consisting of two windings, the terminal of one of which is joined to the middle point of the other, and a neutral conductor connected to the junctions of the windings of said sources.

10. A multiphase rotary converter, a multiphase alternating-current system, and a neutral conductor leading from a point of neutral potential in one phase only of said alternating-current system.

11. The combination of a dynamo-electric machine, provided with taps leading from equally-spaced points in a winding thereon, a plurality of coils carrying currents of different phase, connections between coils of the same phase and points in said winding separated by one-half the polar pitch, and connections between other coils and points in said winding displaced by less than half the polar pitch.

12. A multiphase dynamo-electric machine, a multiphase alternating-current system, and a neutral conductor leading from points of neutral potential in a plurality of coils in one phase only of said alternating-current system.

13. The combination of a six-phase rotary converter, means for generating a set of quarter-phase electromotive forces, means for impressing said electromotive forces upon points in the winding of said converter in such manner as to cause six-phase currents to flow, and a conductor leading from a point of neutral potential in the system of conductors generating the quarter-phase electromotive forces, and coöperating with direct-current mains leading from the commutator of said converter.

14. The combination of a multiphase rotary converter having a number of phases represented by a multiple of three, means for generating quarter-phase electromotive forces, and means for impressing said electromotive forces upon said converter in such a manner as to cause the currents acting therein to have a phase relation different from that of said electromotive forces.

15. The combination of a multiphase rotary converter having a number of phases represented by a multiple of three, means for generating quarter-phase electromotive forces, means for impressing said electromotive forces upon said converter in such a manner as to cause the currents acting therein to have a phase relation different from that of said electromotive forces, and a conductor leading from a point of neutral potential on the generating system for the quarter-phase electromotive forces and coöperating with the direct-current mains of said converter.

16. The combination of an armature provided with a commutator, and T-connected windings connected to the armature through collector-rings.

17. The combination of an armature provided with a commutator, two windings having a terminal of one connected to an intermediate point in the length of the other, and connections between the armature and the free terminals of said windings.

18. The combination of an armature provided with a commutator, two windings having a terminal of one connected to an intermediate point in the length of the other, connections between the armature and the free terminals of said windings, direct-current mains leading from the commutator, and a neutral conductor connected to an intermediate point in the length of one of said windings and coöperating with said mains.

19. The combination of an armature, a commutator, T-connected windings connected to the armature, direct-current mains extending from the commutator, and a neutral conductor connected to one of said windings.

20. The combination of an armature, a commutator, T-connected windings connected to the armature, direct-current mains extending from the commutator, and a neutral conductor connected to an intermediate point in the length of one of said windings.

In witness whereof we have hereunto set our hands this 19th day of December, 1899.

CHARLES P. STEINMETZ.
WILLIAM L. R. EMMET.

Witnesses:
BENJAMIN B. HULL,
JOSEPH GROSS.